United States Patent [19]

Buchanan et al.

[11] 4,203,045
[45] May 13, 1980

[54] THERMALLY PROTECTED DYNAMOELECTRIC MACHINE

[75] Inventors: Lloyd W. Buchanan, American Township, Allen County; Noah E. Eberhart, Bath Township, Allen County; Arthur D. Szabo, American Township, Allen County, all of Ohio

[73] Assignee: Westinghouse Electric Corp., Pittsburgh, Pa.

[21] Appl. No.: 895,680

[22] Filed: Apr. 12, 1978

[51] Int. Cl.² ............................................. H02K 11/10
[52] U.S. Cl. .................................................. 310/68 C
[58] Field of Search ........................... 310/68 R, 68 C

[56] References Cited

U.S. PATENT DOCUMENTS

| 3,319,096 | 5/1967 | Eberhart, Jr. | 310/68 |
| 3,875,439 | 4/1975 | Roach | 310/68 C |

FOREIGN PATENT DOCUMENTS

| 177180 | 1/1954 | Austria | 310/68 C |
| 63837 | 9/1948 | Netherlands | 310/68 C |

Primary Examiner—Donovan F. Duggan
Attorney, Agent, or Firm—J. W. Keen

[57] ABSTRACT

A dynamoelectric machine having a thermal protector held in intimate thermal contact with the machine's electrical winding by a spring inserted between the machine's enclosing frame and protector. The spring is generally a V-shaped member whose one leg mates with the protector and whose other leg is divided in two with each of those divided legs being engageable with the frame. The closed end of the V-shaped spring member is progressively inserted between the protector and frame with the open end following. The frame engageable legs are sharp and thus gouge into the relatively softer frame so as to resist relative movement between the spring member and frame in the direction opposite its insertion.

4 Claims, 5 Drawing Figures

THERMALLY PROTECTED DYNAMOELECTRIC MACHINE

BACKGROUND OF THE INVENTION

This invention relates to thermally protected dynamoelectric machines, and more particularly to improved means for holding thermal protectors in intimate thermal contact with the winding of such machines.

It is common practice to protect electric motors and other dynamoelectric machines from overheating by utilizing protective devices which respond to the motor temperature and current as measured at the motor winding to disconnect the motor's power supply when overheating is detected. Such thermally protective devices are often attached directly to the motor winding so as to respond directly to the winding's temperature. To ensure that the protector will accurately follow the winding's temperature it is necessary to attach the protector to the winding in intimate heat transfer relation therewith. Early methods for securing the protective device to the winding included tying it and taping it in place, but both were found to be unsatisfactory from cost and/or reliability considerations.

More recently, a generally cane-shaped clamp was inserted in a longitudinal slot formed on the outer periphery of the motor's stator core. The slot is customarily used for aligning laminations during assembly of the stator core or aiding in the orientation of the stator core within the motor's housing or enclosing frame. Such device was patented by Eberhart et al in U.S. Pat. No. 3,319,096 which issued May 9, 1967, and is assigned to the assignee of the present invention. The "handle" of the cane member encompassed the thermal protective device and secured it against the winding when the "straight" portion of the cane was pushed or driven into the core's slot between the slot's bottom and the enclosing frame. To ensure that the slot-inserted cane portion securely retains the protective device in the desired position, the straight portion was sometimes slightly tapered or bowed. Recently, a new, "slab-sided" core was developed which had flat sides which includes slots whose radially inner boundaries were separated from the frame by distances that were considerably greater than completely round cores. It was found that such cane-shaped clamps, when sufficiently bowed to span the greater distances, had insufficient spring and flexibility to hold the thermal protectors in optimum heat transfer with the motor's windings. An additional disadvantage of the prior art clamp is that it must be precisely located to permit insertion into the assembly slot formed in the stator core since the clamp's securing capability obtains from its force fit in that slot. Due to the character of the aforementioned force fit, the prior art protector clamp must be driven or impacted into the slot and such insertion procedure can promote damage and sometimes breakage of the clamp.

SUMMARY OF THE INVENTION

In general, a dynamoelectric machine made in accordance with this invention comprises a frame, a stator core member supported within the frame, a winding situated in the stator core, a thermal protective device for disconnecting the electrical power to the winding in response to excessive winding temperatures, and a spring which is engageable with the frame and thermal protective device so as to bias the thermal protective device into intimate heat transfer relationship with the winding. The spring is preferably three legged in a substantially V-shaped configuration wherein one of its legs engages the thermal protective device and its other two legs engage the frame. The spring's protective device engaging leg preferably includes a portion which mates with the protective device and limits the spring's extent of insertion between the frame and protective device. The frame engaging legs of the spring are preferably harder than the frame and are sharpened so as to gouge into the frame and restrict unintentional withdrawal of the spring from its engagement position between the protective device and frame.

BRIEF DESCRIPTION OF THE DRAWINGS

The objects and advantages of this invention will be more apparent from reading the following detailed description in connection with the accompanying drawings, in which.

DESCRIPTION OF THE PREFERRED EMBODIMENT

Figure 1:
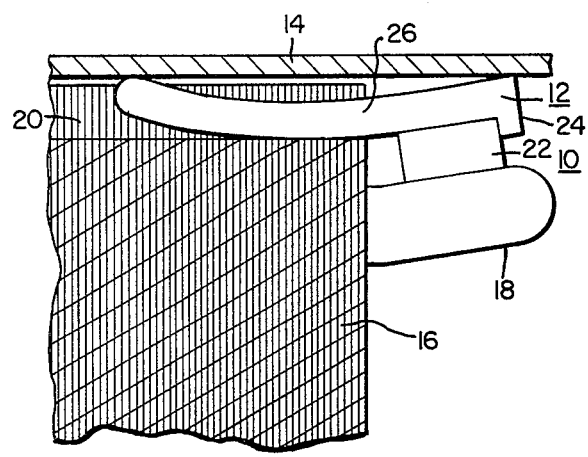
FIG. 1 is a partial longitudinal sectional view of a prior art electrical motor.

Referring now to the drawings in detail, FIG. 1 shows a partial sectional view of an electric motor 10 utilizing a prior art, cane-shaped thermal protector clamp 12. Electric motor 10 has a frame 14 which surrounds laminated stator core 16 in which winding 18 is disposed. Longitudinal slot 20 is customarily formed on the outer periphery of stator core 16 for aiding in lamination alignment during stator core assembly and developing proper orientation of stator core 16 in frame 14. Thermal protective device 22 is held in intimate thermal contact with winding 18 preferably in the end turn regions of stator core 16. When the temperature of winding 18 increases beyond a predetermined limit, thermal protection device 22 opens the motor's power supply circuit and prevents the flow of electrical energy to winding 18.

The prior art clamping member 12 has a hook-shaped clamping portion 24 which is shaped to mate with thermal protective device 22 and hold it against winding 18 in good heat transfer relationship. Clamping portion 24 is joined with supporting portion 26 which may be pushed or driven into slot 20 to obtain a force fit between stator core 16 and frame 14. Supporting portion 26 is progressively driven into slot 20 until clamping portion 24 engages thermal protective device 22 and holds it tightly against winding 18 to ensure that protective device 22 accurately responds to the winding's temperature.

Figure 2:
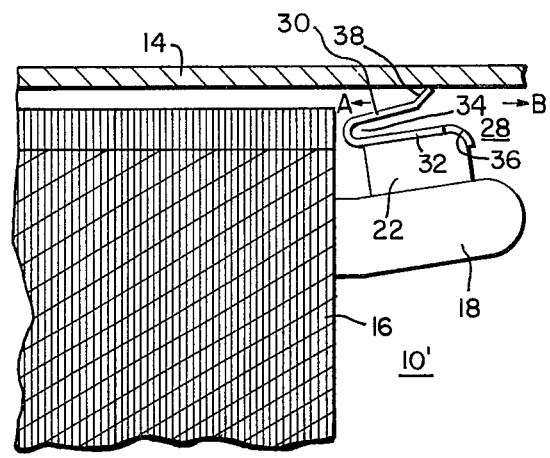
FIG. 2 is a partial longitudinal sectional view of the present invention.

FIG. 2 is a partial sectional view of the present invention motor 10'. FIG. 2 illustrates spring member 28 disposed between frame 14 and thermal protector 22. During insertion of spring member 28 between frame 14 and protector 22, opposing legs 30 and 32 are angularly displaced toward each other to decrease angle 34 from its normal magnitude when spring 28 is situated in the free, unstressed state. Thermal protector engagement leg 32 includes a movement restraining section 36 which mates with one end of thermal protector 22 and limits the extent that spring 28 may be inserted. Frame engagement legs 30 include contact sections 38 which each have at least one sharp edge that is harder than frame 14. After insertion of spring 28 between thermal protector 22 and frame 14 in the illustrated "A" direction, extractive movement of spring 28 in the "B" direction is resisted by contact sections 38 which tend to gouge into frame 14 and prevent relative movement between frame 14 and spring 28. Angle 34 of spring 28 may be suitably decreased to account for differences in the size of winding 18 while maintaining sufficient biasing force to hold protector 22 in intimate heat transfer contact with winding 18.

Figure 3B:
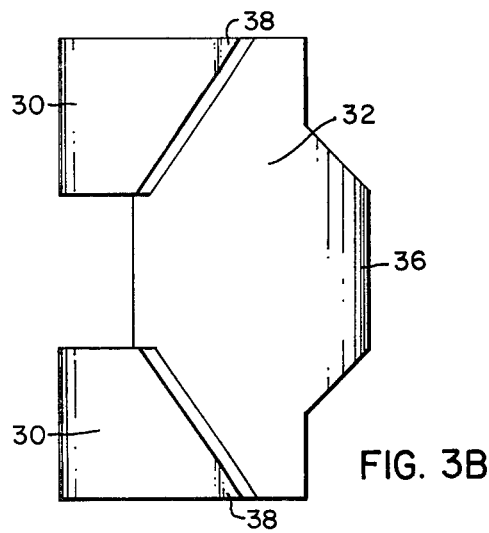
FIGS. 3A through 3C are elevation views of the present invention's spring member.
Figure 3A:
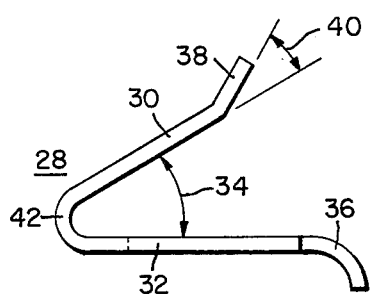
Figure 3C:
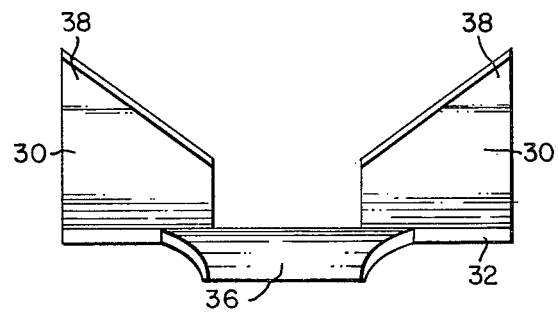

FIGS. 3A through 3C illustrate three elevation views of spring 28 in which, by way of example, angles 34 and 40 are 30° and juncture 42, where legs 30 and 32 are connected, has a radius of curvature of 0.03 inches. Although certain preferred angles and radii have been indicated as being preferred, it is to be understood that the angles of spring 28, linear dimensions thereof, and blending radii may be appropriately adjusted to account for size variations in winding 18, frame 14, and separating distance therebetween. Spring 28, when used for biasing thermal protector 22 against winding 18, causes thermal protector 22 to accurately follow the temperature of winding 18 and provides restraints against movement of protector 22 relative to spring 28 and movement of spring 28 relative to frame 14. As such, spring 28 provides a low cost, self-locking means for ensuring good thermal contact between winding 18 and thermal protector 22.

What we claim is:

1. A dynamoelectric machine comprising:
    a frame;
    a stator core member supported in said frame;
    a winding disposed in said stator core;
    a thermally responsive protective device disposed against said winding; and
    a spring member disposed between and engaged with said frame and said protective device for biasing said protective device against said winding in intimate contact therewith,
    said spring member comprising:
        a first portion engageable with said protective device and a second portion penetratingly engageable with said frame, said first and second portions being connected at a juncture to form a first angle of predetermined magnitude, said juncture being insertable between said protective device and said frame prior to said first and second portions, said first and second portions providing increased biasing force as said first angle is decreased during progressive insertion of said spring member between said frame and said protective device.

2. The dynamoelectric machine of claim 1, said spring member further comprising:
    a restraining section included in said first portion, said restraining section being matable with said protective device to restrict said protective device's movement along said winding away from said stator core and limit the spring's insertion distance.

3. The dynamoelectric machine of claim 2 wherein said restraining section extends toward said winding at the axial end of said protective device facing away from said stator core.

4. The dynamoelectric machine of claim 1, said spring member further comprising:
    a contact section included in said second portion, said contact section being disposed at a second angle from said first portion, said second angle being greater than said first angle, said contact section being harder than said frame and having at least one sharp edge which is biasable against said frame so as to gouge thereinto and resist relative movement between said spring member and frame.

* * * * *